No. 761,265. Patented May 31, 1904.

UNITED STATES PATENT OFFICE.

CHARLES E. SWETT, OF PROVIDENCE, RHODE ISLAND, ASSIGNOR OF ONE-HALF TO ROBERT H. HUTCHISON, OF NEW YORK, N. Y.

PROCESS OF RECOVERING WOOL-FAT.

SPECIFICATION forming part of Letters Patent No. 761,265, dated May 31, 1904.

Application filed March 10, 1903. Serial No. 147,174. (No specimens.)

*To all whom it may concern:*

Be it known that I, CHARLES E. SWETT, a citizen of the United States, residing at Providence, in the county of Providence and State of Rhode Island, have invented a new and useful Process of Extracting Fat from Wool Wash-Waters, of which the following is a specification.

This invention relates to a novel process for the recovery of the fats from wool wash-water.

It may be stated by way of premise that wool-fleece is usually cleansed by washing with alkalies dissolved in water. The wash-water sometimes has soap added to it, sometimes not. By this means an organic excretion known as "suint," together with various substances generically known as "dirt," is removed. This suint contains elements of recognized value—for instance, wool-wax, which is a highly-complex body, potash salts, and if soap has been added to the wash-waters this soap will also be contained in said suint. The article of chief value in said suint is the fat. All fats are valuable; but the value of wool-fat as ordinarily recovered is lessened by its dark color and objectionable odor, which damaging characteristics appear to be due chiefly to a process of putrefaction which is incidental to the recovery of the fat by usual methods.

The object of my invention is twofold: first, the recovery of the fat in a more merchantable condition than by usual methods, and, second, the more complete removal of fat and accompanying organic matters from the water than by usual methods.

In the suint the fats exist partly as soap and partly in emulsion. It has been proposed to first add an acid to this fatty emulsion or suint, and thereby liberate the fatty matters from the emulsion; but this has been found to be impracticable, for the reason that if the greasy wash-waters be so treated the fats will remain suspended in a finely-divided condition in the liquid, neither rising to the surface nor falling to the bottom. To overcome this difficulty, the water is sometimes heated to a relatively high temperature; but this treatment is unduly expensive. The more usual method is to allow the wash-waters to putrefy, after which by the addition of an acid a more or less satisfactory separation is effected. Obviously, however, by this method the generation of noxious odors is incidental and the fat afterward separated is lessened in value by its dark color and objectionable odor.

To the accomplishment of the objects hereinbefore stated, the process originated by me as distinguished from those above recited is practiced in the following manner: To the fresh cool greasy water an oxidizing agent, preferably an alkaline manganate or permanganate, is added. If an alkaline manganate or permanganate be used, the further addition is stopped when the color imparted to the water by such addition disappears rather slowly from the solution. I next add an alkali-neutralizing agent or acid until the fat in dilute solution and emulsion is separated and rises to the surface of the water as a thick magma. This magma is then removed, and the grease is separated therefrom in any approved manner, as by the expression of the free moisture in a press or by removing the greater portion of the water by mechanical means and recovering the grease from the resulting mass by the action of a volatile solvent—such as, for instance, carbon disulfid or petroleum-naphtha, the petroleum-naphtha being generally preferable.

By the practice of this method a wool-fat of good merchantable color and practically odorless is secured. No objectionable odors are incidental to such recovery, and as the abstraction of the organic matter is effective the pollution of the water-course into which effluent waste water escapes is avoided. It should be understood, however, that while the process is preferably practiced in the particular manner recited I do not limit myself to this exact order of procedure, since it is possible to vary the same somewhat—as, for instance, to treat the emulsion first with acid and thereafter with an oxidizing agent—without departing from the spirit of the invention.

What I claim is—

1. That process for the recovery of wool-fat from wool wash-waters which consists in adding to the water an alkaline manganate or permanganate until the color imparted to the water by such addition disappears from the solution, next adding an acid until the fat in dilute solution and emulsion is separated and rises to the surface of the water as a thick magma, and thereafter abstracting the fat from the magma thus produced.

2. That process for the recovery of wool-fat from wool wash-water which consists in adding to the water an alkaline manganate or permanganate as an oxidizing agent, next adding an acid to neutralize the alkalies, next removing the magma and eliminating the excess moisture, and finally treating the residue with a volatile solvent to recover the fat.

In testimony that I claim the foregoing as my own I have hereto affixed my signature in the presence of two witnesses.

CHARLES E. SWETT.

Witnesses:
TERENCE M. O'REILLY,
WASHINGTON R. PRESCOTT.